(12) United States Patent
Fukumura

(10) Patent No.: US 6,879,872 B2
(45) Date of Patent: Apr. 12, 2005

(54) METHOD FOR GENERATING THREE-DIMENSIONAL SHEET-METAL MODEL AND A COMPUTER PROGRAM

(75) Inventor: Yuichiro Fukumura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/739,295

(22) Filed: Dec. 19, 2003

(65) Prior Publication Data

US 2004/0148046 A1 Jul. 29, 2004

(30) Foreign Application Priority Data

Jan. 29, 2003 (JP) ........................................ 2003-019889

(51) Int. Cl.$^7$ .......................... G06F 17/00; G06F 19/00
(52) U.S. Cl. ........................ 700/165; 700/95; 700/145; 700/182; 345/419
(58) Field of Search .......................... 700/95, 159, 145, 700/163, 165, 182; 345/418–419, 441–442, 619; 703/1, 2

(56) References Cited

U.S. PATENT DOCUMENTS 4,912,644 A * 3/1990 Aoyama et al. .............. 700/98
6,542,937 B1 * 4/2003 Kask et al. .................. 719/328
2002/0065790 A1 * 5/2002 Oouchi ........................ 705/400

FOREIGN PATENT DOCUMENTS

| JP | 7-141527 | * 6/1995 |
| JP | 11-202919 | 7/1999 |
| JP | 2001-142517 | * 5/2001 |

* cited by examiner

*Primary Examiner*—Jayprakash N. Gandhi
(74) *Attorney, Agent, or Firm*—Staas & Halsey LLP

(57) ABSTRACT

A method for generating a three-dimensional sheet-metal model utilizing a feature for generating a general solid model without a sheet-metal attribution is provided. The method includes the steps of estimating a thickness of a sheet-metal from a cross section designated by a user, representing a bent portion of the sheet-metal by rotating a cross section designated by the user around a set axis in accordance with a bending direction designated by the user and by sweeping the rotated cross section by a length designated by the user, representing an abutting portion by sweeping a cross section designated by the user by a length designated by the user, and realizing sheet division by a sweep slit that is formed by sweeping a tiny cross section including a division line designated by the user on a plane designated by the user.

9 Claims, 12 Drawing Sheets

METHOD FOR GENERATING THREE-DIMENSIONAL SHEET-METAL MODEL AND A COMPUTER PROGRAM

BACKGROUND OF THE INVENTION

1. Field of the Invention

The present invention relates to a method for generating a three-dimensional sheet-metal model on a computer screen using a CAD. More specifically, the present invention relates to a method and a computer program for generating a three-dimensional sheet-metal model on a computer screen using a CAD for generating a solid model by a general feature without a sheet-metal attribution.

2. Description of the Prior Art

When generating a three-dimensional sheet-metal model on a computer screen using a CAD, it is necessary to think about an automatic development and an actual machine process. For example, knowledge is required that is different from a usual three-dimensional modeling and is related to shapes including a "bending portion", an "abutting portion" and a "sheet division" depending on a thickness and a material of the sheet-metal.

A method for generating a three-dimensional model from a two-dimensional CAD drawing is disclosed in Japanese unexamined patent publication No. 11-202919 for example. Conventionally, it is common to generate a three-dimensional sheet-metal model by one of two methods (approaches) as below.

In the first method, a user of the CAD intends to make a sheet-metal model from the beginning and sets sheet-metal attributions before starting the generation of a model for a sheet metal. The CAD process makes the user designate sheet-metal attributions such as a material and a thickness of the sheet metal to be processed for the sheet-metal model, and a special model having parameters thereof is generated to be a three-dimensional sheet-metal model. The parameters that are necessary for operations of "bending portion" and "sheet division" that are performed on the screen by the user are determined in accordance with the sheet-metal attributions that were set first. Therefore, a general solid model without sheet-metal attributions cannot be processed.

In the second method, a general solid model is generated first without considering a sheet metal, and after that the solid model is processed to be a sheet-metal model. For example, a shell model that is one type of a solid model can be generated by an operation of hollowing (boring) a block model with remaining a wall of a designated thickness. After that, shapes necessary for a sheet-metal model such as a "bending portion", an "abutting portion" and a "sheet division" are generated.

In the above-mentioned two methods for generating a three-dimensional sheet-metal model using a CAD, the first method is closer to human thinking than the second method is. Namely, the method in which the user of the CAD intends to make a sheet-metal model from the beginning and sets sheet-metal attributions before generating a model for the sheet metal is closer to human thinking because it is closer to a real machine process of bending a sheet metal. However, this method has some disadvantages as follows.

Namely, a user of a CAD has to set necessary sheet-metal attributions (such as a thickness and a material of the sheet-metal) considering generation of a sheet-metal model from the start of the modeling. In addition, if the existing model is a model generated by another CAD system or a model without sheet-metal attributions, it is difficult to process the model so as to make a sheet-metal model because of limitation of compatibility between the CAD systems.

SUMMARY OF THE INVENTION

An object of the present invention is to provide a method for generating a three-dimensional sheet-metal model utilizing a feature for generating a general solid model without a sheet-metal attribution.

A method according to the present invention is for generating a three-dimensional sheet-metal model on a computer screen using a CAD for generating a solid model by a general feature without a sheet-metal attribution. The method includes the steps of (a) estimating a thickness of a sheet-metal from a cross section designated by a user, (b) representing a bent portion of the sheet-metal by rotating a cross section designated by the user around a set axis in accordance with a bending direction designated by the user and by sweeping the rotated cross section by a length designated by the user, (c) representing an abutting portion by sweeping a cross section designated by the user by a length designated by the user, and (d) realizing sheet division by a sweep slit that is formed by sweeping a tiny cross section including a division line designated by the user on a plane designated by the user.

A computer program according to the present invention is installed in and executed by a computer as a CAD program for generating a three-dimensional sheet-metal model on a computer screen. The program cooperates with a CAD program for generating a solid model by a general feature without a sheet-metal attribution and makes the computer execute the process including the steps of (a) estimating a thickness of a sheet-metal from a cross section designated by a user, (b) representing a bent portion of the sheet-metal by rotating a cross section designated by the user around a set axis in accordance with a bending direction designated by the user and by sweeping the rotated cross section by a length designated by the user, (c) representing an abutting portion by sweeping a cross section designated by the user by a length designated by the user, and (d) realizing sheet division by a sweep slit that is formed by sweeping a tiny cross section including a division line designated by the user on a plane designated by the user.

According to the method and the computer program having the above feature, it is possible to add shapes with consideration about a sheet-metal on the basis of an existing three-dimensional model generated in which a sheet-metal is not considered or data indicating only a shape generated by another system, without setting sheet-metal attributions such as a material and a thickness of the sheet-metal. In addition, since a sheet-metal model can be generated utilizing a general feature without utilizing a special feature unique to a sheet metal, the user is not required to obtain knowledge about the feature unique to a sheet-metal model.

In a preferred structure, the step (a) for estimating a thickness of the sheet-metal includes the substeps of searching an edge that is closest to a point designated by the user for designating the cross section, searching an edge that is opposed to the edge in parallel, and estimating a distance between the two searched edges as the thickness of the sheet-metal.

In another preferred structure, if the cross section designated by the user includes a curve edge in the step (b) for representing a bent portion of the sheet-metal, the step (b) includes the substep of determining a cross section for bending that is a rectangular cross section area including a point designated by the user for designating the cross section except for the curve edge area.

In still another preferred structure, if the cross section designated by the user includes a curve edge in the step (c) for representing an abutting portion, the step (c) includes the substep of determining a cross section to be swept that is selected from a group of (i) a rectangular cross section area including a point designated by the user for designating the cross section except for the curve edge area, (ii) the rectangular cross section area plus the curve edge area and (iii) the entire area of cross section designated by the user.

The above-mentioned computer program can be recorded in a computer readable recording medium such as a CD-ROM for distributing and can be installed in a computer from the recording medium to be executed.

DESCRIPTION OF THE PREFERRED EMBODIMENTS

Hereinafter, the present invention will be explained more in detail with reference to embodiments and drawings.

Figure 1:
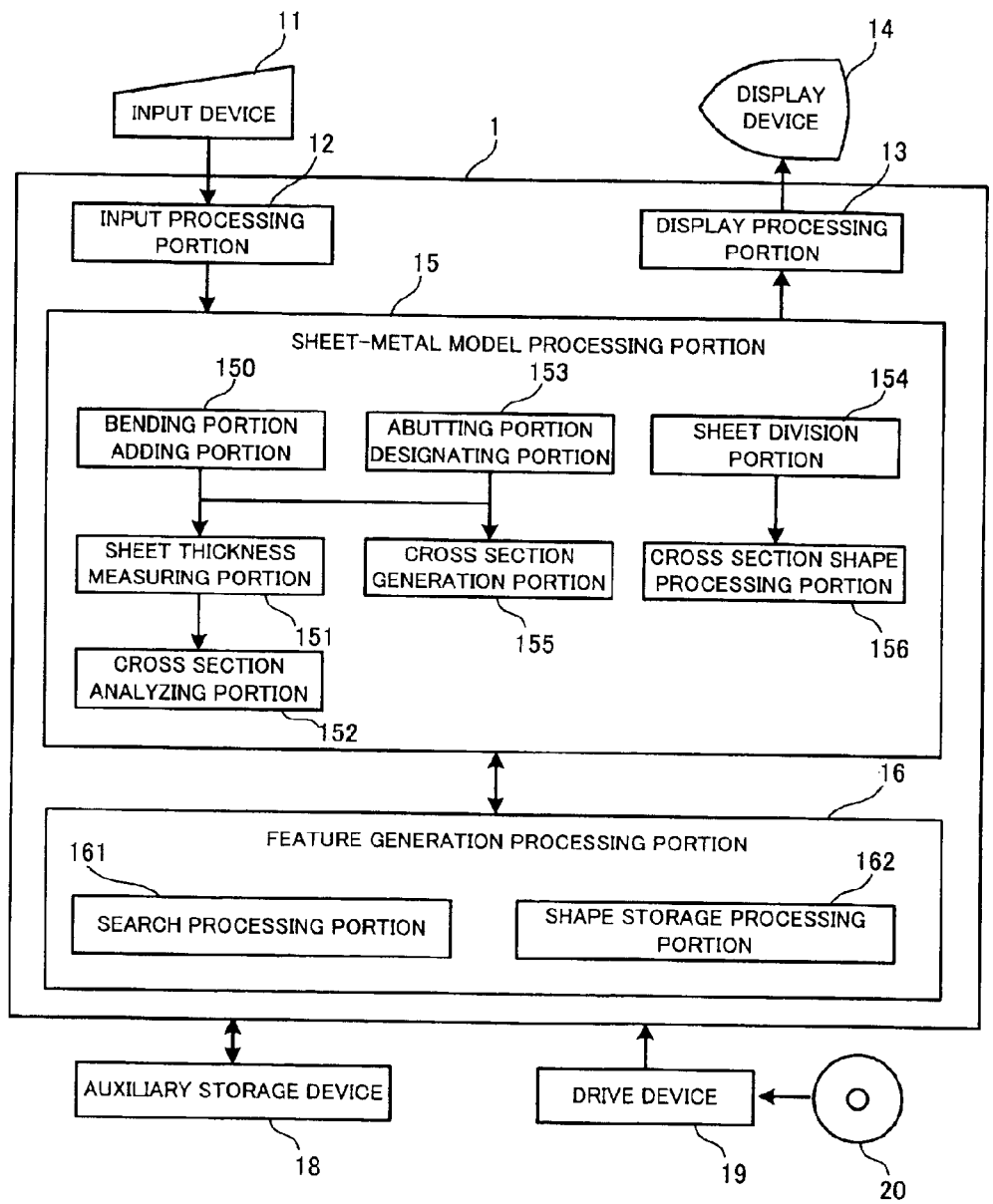
FIG. 1 is a block diagram showing a structure of a CAD system according to an embodiment of the present invention.

FIG. 1 is a block diagram showing a structure of a CAD system according to an embodiment of the present invention. This CAD system is structured by installing a computer program (software) for a CAD in a computer system such as a personal computer. The computer system includes a CPU (Central Processing Unit), a main memory, an input device 11 such as a keyboard or a mouse (a pointing device), a display device 14 such as a CRT or a LCD, an auxiliary storage device 18 such as a hard disk drive and a drive device 19 of a removable recording medium.

A CAD program that constitutes the CAD system according to the present invention is stored in a removable recording medium 20 such as a CD-ROM (an optical memory disk) for distributing and is installed in the auxiliary storage device 18 through the drive device 19. The CAD program installed in the auxiliary storage device 18 is loaded into the main memory and is executed by the CPU. In the structure as shown in FIG. 1, a central portion of the CAD system constituted by the CPU and the main memory (loaded with the CAD program) is represented by a functional block of a CAD processing portion 1.

The CAD processing portion 1 includes an input processing portion 12, a display processing portion 13, a sheet-metal model processing portion 15, and a feature generation processing portion 16. The input processing portion 12 processes various data and instructions entered through the input device 11 by the user and passes them to the sheet-metal model processing portion 15. The display processing portion 13 processes display data received from the sheet-metal model processing portion 15 and passes them to the display device 14.

The sheet-metal model processing portion 15 is a core portion for performing the process of generating a three-dimensional sheet-metal model according to the present invention, which includes a bending portion adding portion 150, a sheet thickness measuring portion 151, a cross section analyzing portion 152, an abutting portion designating portion 153, a sheet division portion 154, a cross section generation portion 155 and a cross section shape processing portion 156. Functions of these portions will be explained later.

The feature generation processing portion 16 performs a process of a general solid model three-dimensional CAD and includes a search processing portion 161 and a shape storage processing portion 162. The sheet-metal model processing portion 15 utilizes these functions of a general CAD so that a feature of a three-dimensional sheet-metal model can be generated.

The search processing portion 161 is used for searching an edge (a line) or a closed area near a point designated by a user. The shape storage processing portion 162 stores various shapes including a line, a polygon and an arc, which are used for bending process by rotation and sweeping, for example. Hereinafter, a specific shape model will be used for explaining a function and an operation of the CAD processing portion 1.

Figure 2:
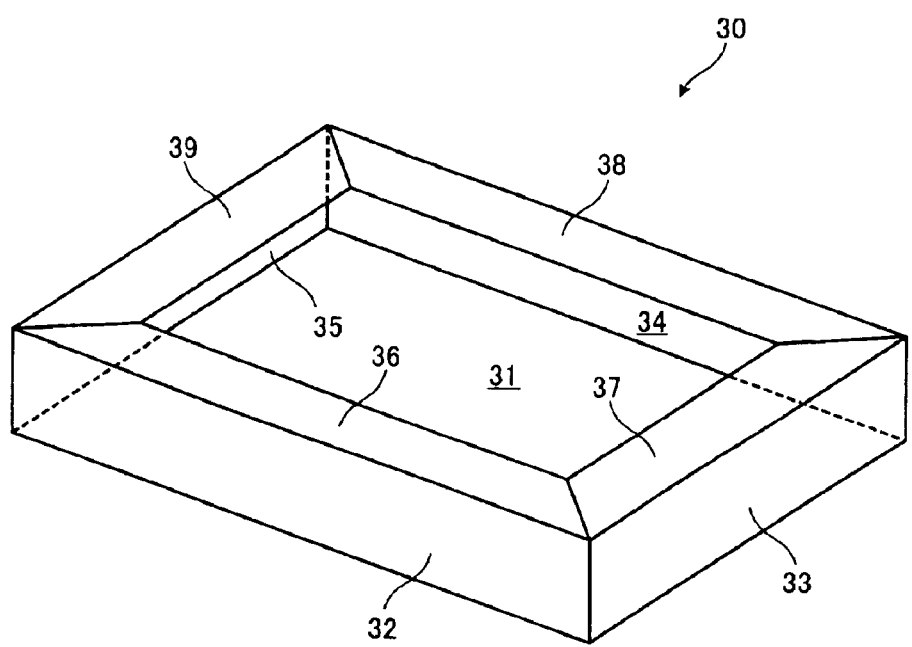
FIG. 2 shows an example of a sheet-metal model for explaining this embodiment.

FIG. 2 shows an example of a sheet-metal model for explaining this embodiment. This sheet-metal model 30 is a rectangular box having an opening in the middle portion of the upper surface. The rim portion of the upper surface is covered with plates bending inwardly from four side plates like a collar. When generating this sheet-metal model using a sheet-metal CAD system of this embodiment, side plates 32–35 are raised from four sides of the bottom plate 31 by the bending process, and upper surface rim portions 36–39 are formed from upper sides of the side plates 32–35 inwardly by the bending process.

On this occasion, abutting portion shapes are generated at boundaries between neighboring side plates among the four side plates 32–35. In addition, a sheet division process is performed so as to separate the upper surface rim portions 36–39, which are bent inwardly from the upper sides of the four side plates 32–35. These processes will be explained step by step as below.

Figure 3A:
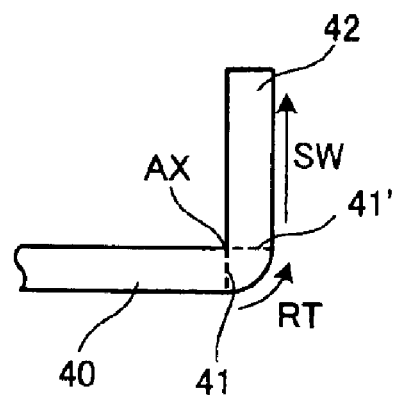
FIGS. 3A and 3B show a method for realizing a bending process in this embodiment.
Figure 3B:
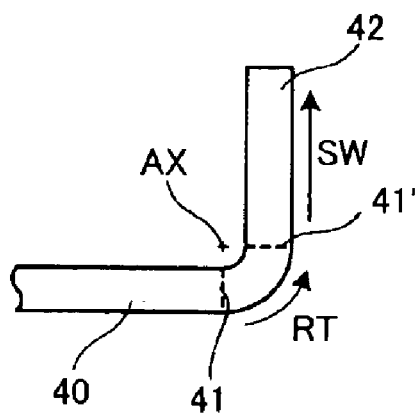

FIGS. 3A and 3B show a method for realizing the bending process in this embodiment. When the bending process is performed on a real sheet-metal, at least the outer surface of the bent portion is not a right angle shape but a curved surface having a cross section of an arc edge. In the sheet-metal CAD system of this embodiment, the end surface (the surface to which the bending process is added) 41 of the base plate 40 (e.g., the bottom plate 31 as shown in FIG. 2) is rotated around the axis AX so as to represent the bent portion. This rotation feature is included in a general three-dimensional CAD. FIG. 3A shows the case where the axis AX that is the center of the rotation is positioned at an edge of the end surface (also referred to as a cross section) 41, while FIG. 3B shows the case where the axis AX that is the center of the rotation is offset (shifted) from the edge of the end surface 41.

Furthermore, the rotated end surface 41' is moved as parallel displacement in a sweeping process so that a vertical plate 42 connected to the base plate 40 is formed. This sweep feature is also included in a general three-dimensional CAD. The cross section (the end surface 41) of the rotation feature can be used as the cross section shape (the end surface 41') for sweeping without any change.

In the example as shown in FIGS. 3A and 3B, the end surface 41 is processed with rotation by 90 degrees around the axis AX so that the bent portion from the end surface 41 to the rotated end surface 41' is formed, and the rotated end surface 41' is pulled (swept) upwardly by a predetermined length. Thus, the vertical plate 42 (e.g., the side plates 32–35 as shown in FIG. 2) is generated. In this way, without using a special feature for representing a bent portion of the sheet-metal, a bending process of the sheet-metal model can be represented.

In order to represent the bending process by the above-mentioned method, it is necessary to designate the end surface (the cross section) 41 and the axis AX to be the center of rotation of the end surface (the cross section) 41. First, the process for designating the cross section 41 will be explained, which is performed by the bending portion adding portion 150, the sheet thickness measuring portion 151 and the cross section analyzing portion 152 as shown in FIG. 1.

In the example of the sheet-metal model as shown in FIG. 2, the end surface to which the bent shape is added can be designated rather easily if the first side plate (e.g., the side plate 32) is formed by the bending process from the bottom plate 31 that is in the state of one flat plate. When the user designates one of the four end surfaces of the bottom plate 31 using a mouse for example, the entire area of the end surface is recognized as the cross section on which the bending process is performed.

Figure 4:
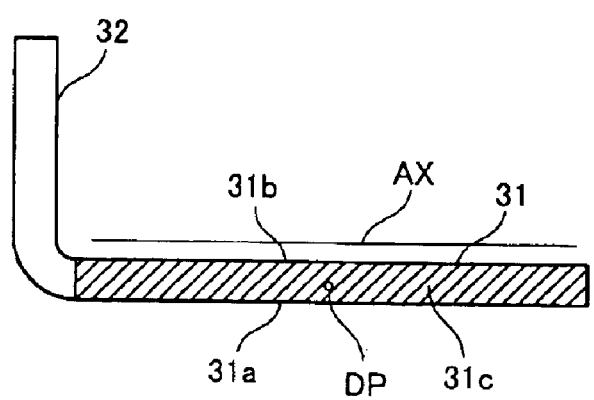
FIG. 4 is a diagram for explaining a method for determining a cross section for the bending process.

However, in the case where the side plate 33 is added by the bending process after the side plate 32 is added to the bottom plate 31, it is necessary to determine the cross section 31c to which the bending process is added within the cross section designated by the user using a mouse (the designated point DP) as shown in FIG. 4.

In FIG. 4, when the user designates the designated point DP by the mouse, the closed area including the designated point DP is detected as a designated surface, which is a L-shaped cross section including the end surface of the side plate 32. However, rectangular area 31c with hatching within the L-shaped cross section is the cross section to which the bending process is added for generating the side plate 33. In general, there is infinite number of surface shapes, so the shape of the cross section is analyzed by the number of edges constituting the surface as explained below.

Figure 5:
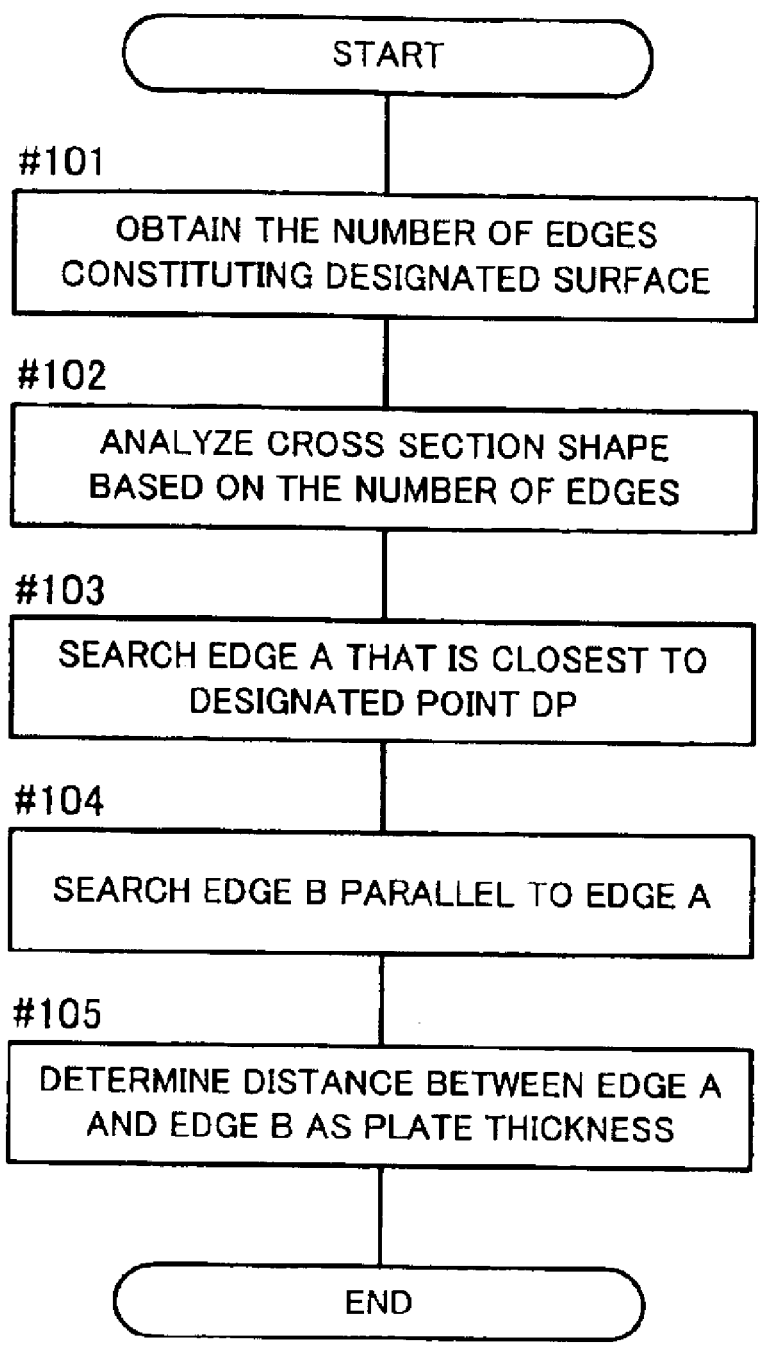
FIG. 5 is a flowchart of a process for determining a cross section for the bending process.

FIG. 5 is a flowchart of a process for determining the end surface (the cross section) to which the bending process is added. In Step #101, the number of edges constituting the designated surface is obtained. In Step #102, the shape of the cross section is analyzed in accordance with the number of the edges. The edges constituting the designated surface are divided into straight lines (i.e., edges constituting a sheet-metal surface) and curved lines (i.e., arcs constituting a bent portion). Then, the edge A that is closest to the designated point DP (the edge 31a in FIG. 4) is searched among the edges constituting the sheet-metal surface (Step #103). In addition, the edge B (the edge 31b in FIG. 4) is searched, which is regarded to be an edge of a surface opposed to the surface of the edge A (Step #104). In the subsequent Step #105, a distance between the edge A and the edge B is determined as a thickness of the plate (by the sheet thickness measuring portion 151).

Figure 6:
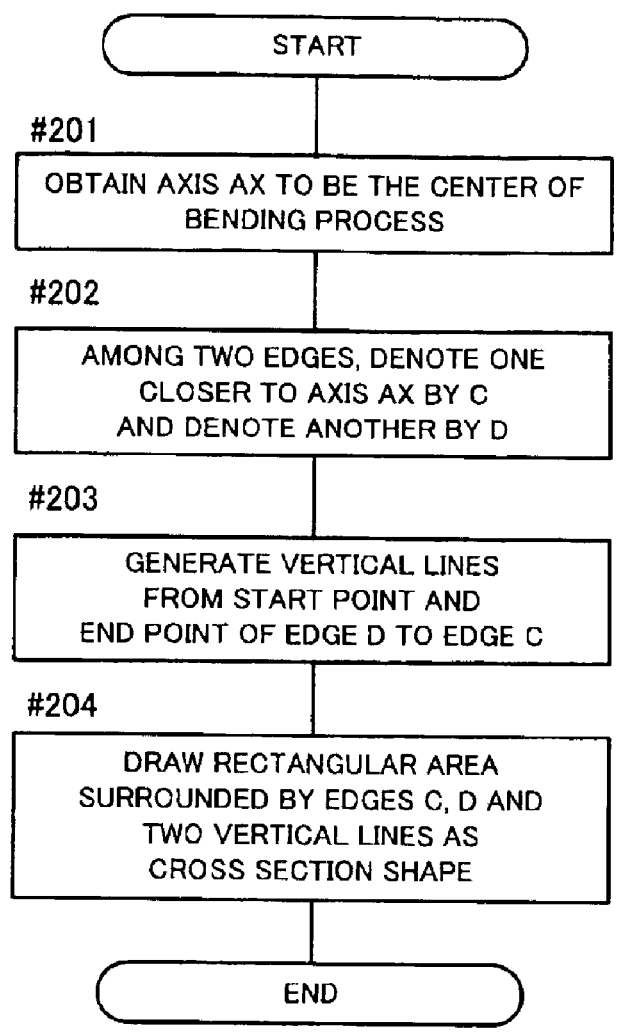
FIG. 6 is a flowchart of an operation of a cross section generation portion.

FIG. 6 is a flowchart of an operation of the cross section generation portion 155. The cross section generation portion 155 performs a process of generating the shape of the cross section from the two edges indicating the sheet-metal surface designated by the process as shown in FIG. 5. First, in Step #201, an axis AX to be the center of the bending process is obtained. As shown in FIG. 4 for example, the axis AX is designated as a straight line in a screen in which the user indicated the designated point DP by the mouse.

Next, among the two edges specified by the process as shown in FIG. 5, one closer to the axis AX (the edge 31b in FIG. 4) is denoted by C, and another (the edge 31a in FIG. 4) is denoted by D (Step #202), then vertical lines are generated from the start point and the end point of the edge D to the edge C (Step #203). After that, the rectangular area (the area 31c in FIG. 4) surrounded by the edges C, D and the two vertical lines is drawn as the cross section shape (Step #204). In this way, the cross section 31c to which the bending process is added as shown in FIG. 4 is specified.

As explained above, four side plates 32–35 are generated from the four end surfaces of the bottom plate 31 of the sheet-metal model as shown in FIG. 2. In this state, a shape of the abutting portion between the side plates should be considered.

Figure 7A:
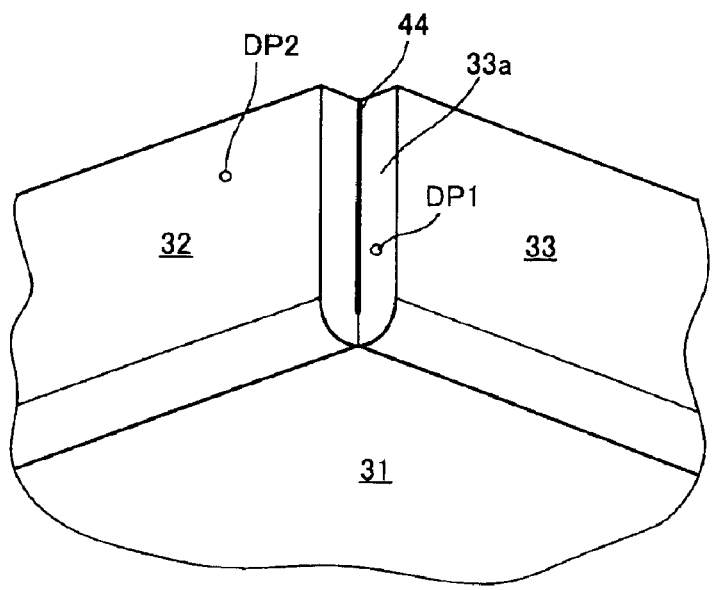
FIGS. 7A and 7B are perspective views showing examples of an abutting portion between side plates.
Figure 7B:
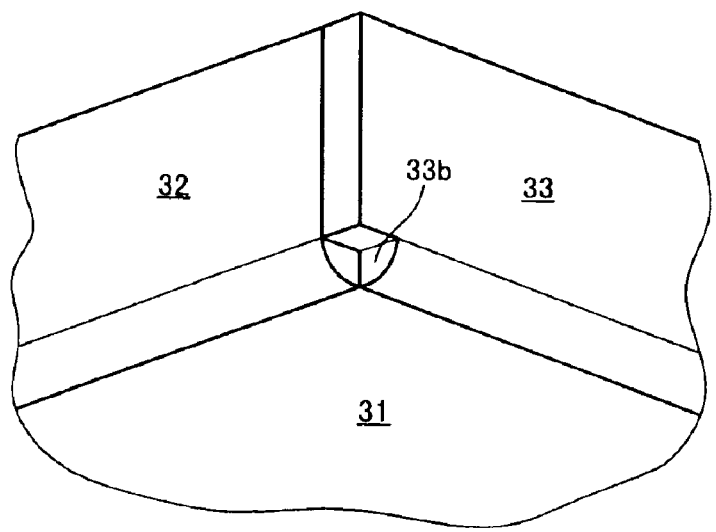

FIGS. 7A and 7B are perspective views showing examples of an abutting portion between side plates. FIG. 7A shows the case where no special process is performed on the abutting portion between the side plates, while FIG. 7B shows the case where one of the end surfaces of the side plates is extended (swept) to the surface of the other side plate at the abutting portion.

In the case as shown in FIG. 7A, a gap 44 must be provided at the abutting portion between the two side plates 32 and 33. This gap 44 can be realized without intention by offsetting (shifting) the position of the axis AX to be the center of the rotation from the edge of the end surface 41 as shown in FIG. 3B.

On the contrary, if the axis AX to be the center of the rotation is on the edge of the end surface as shown in FIG. 3A, the gap 44 at the abutting portion between the side plates 32 and 33 is not generated. In other words, there is an error in which the boundary at the abutting portion between the side plates 32 and 33 constitutes both the edges of the side plates 32 and 33. In order to resolve this error state, a postprocess is necessary for providing the gap 44 at the abutting portion between the side plates 32 and 33. As explained above, offset of the axis AX to be the center of the rotation from the edge of the end surface 41 can realize the gap 44 at the abutting portion between the side plates 32 and 33 without awareness of the user or a postprocess.

In the example as shown in FIG. 7B, the end surface of the one side plate 33 is swept to the surface of the other side plate 32 at the abutting portion between the side plates 32 and 33. The user designates the end surface 33a (the designated point DP1) of the side plate 33 to be swept using a mouse in the state before sweeping as shown in FIG. 7A, and designates the surface of the side plate 32 (designated point DP2) that is the end point of the sweeping.

Also in this case, in the same way as the case of the bending process that was explained with reference to FIG. 4, a closed area including the designated point DP1 is detected as the designated surface when the designated point DP1 is indicated. In the example as shown in FIG. 7B, the cross section to be swept actually is the rectangular portion except for the portion 33b having an arc edge of the bent portion within the designated surface. However, it is possible to set optionally so that the portion 33b having an arc edge of the bent portion is included in the cross section to be swept.

Figure 8:
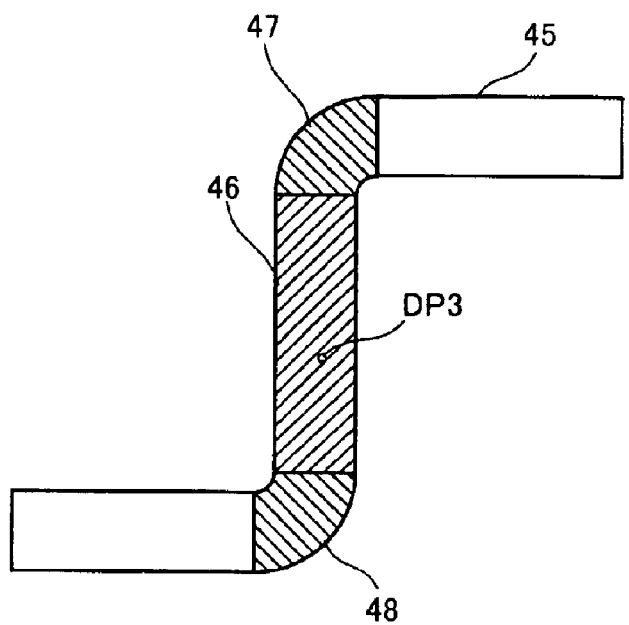
FIG. 8 shows an example of determining a cross section to be swept.

As a general example, the case where the designated surface has a shape as shown in FIG. 8 is considered. In this case, there are three options. In a first option, the rectangular area 46 with hatching including the designated point DP3 within the designated surface 45 is regarded as the cross section to be swept in the same way as the bending process explained with reference to FIG. 4. In the second option, the rectangular area 46 with hatching and the areas 47 and 48 at both sides thereof with reverse hatching having an arc edge are regarded as the cross section to be swept. In the third option, the entire area of the designated surface 45 is regarded as the cross section to be swept.

Figure 9:
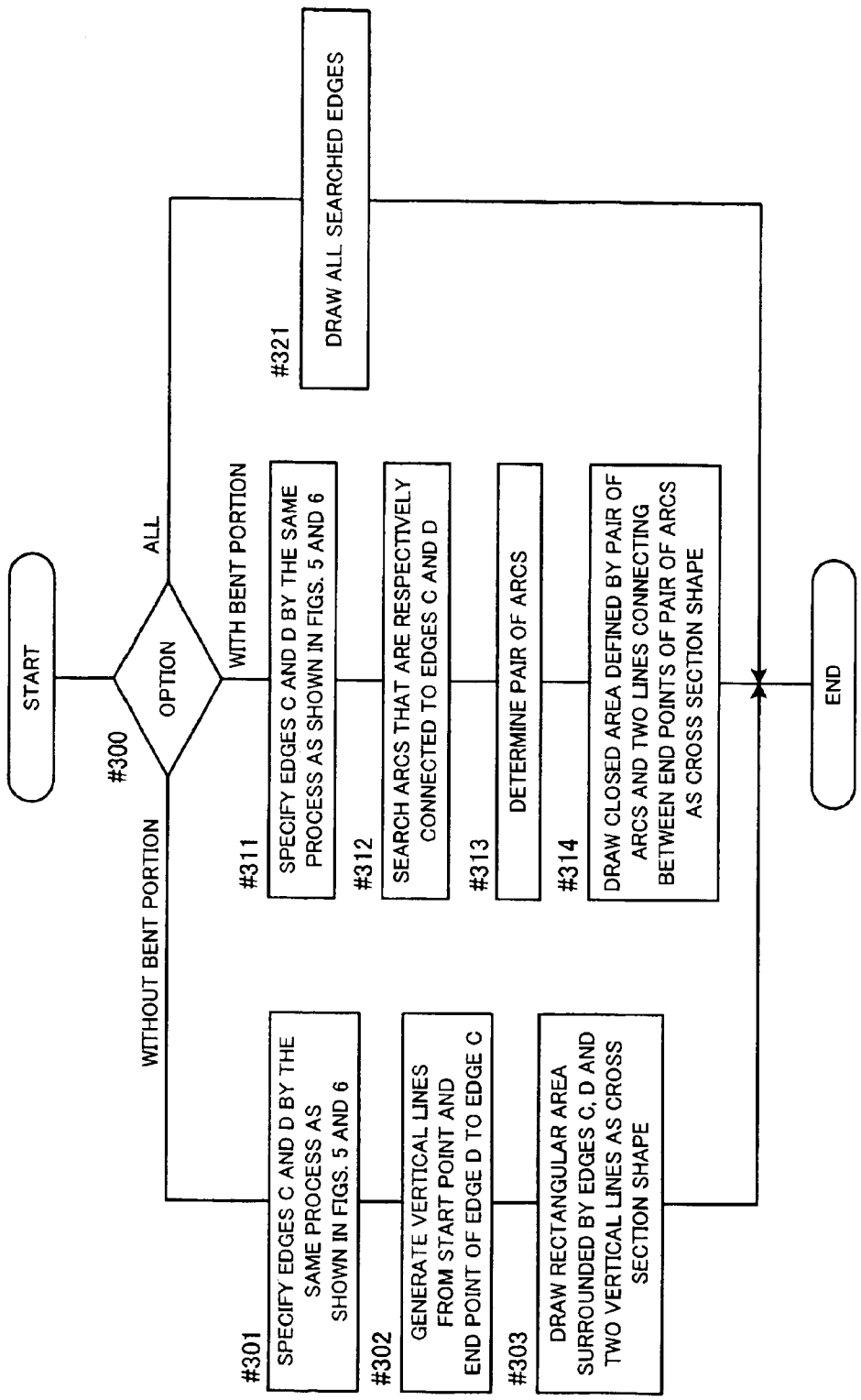
FIG. 9 is a flowchart of a process for determining the cross section to be swept in the abutting portion.

FIG. 9 is a flowchart of a process for determining the cross section to be swept in the abutting portion. The abutting portion designating portion 153 and the cross section generation portion 155 included in the sheet-metal model processing portion 15 as shown in FIG. 1 perform this process. The setting is checked in Step #300. If the first option without a bent portion is set, edges C and D are determined in Step #301 by the same process as shown in FIGS. 5 and 6. In the subsequent Step #302, vertical lines are generated from the start point and the end point of the edge D to the edge C. Then in Step #303, the rectangular area surrounded by the edges C and D and the two vertical lines (the hatching area 46 as shown in FIG. 8) is drawn as the cross section shape (regarded as the cross section to be swept).

If the second option with a bent portion (including a portion having an arc edge) is set in Step #300, edges C and D are specified by the same process as shown in FIGS. 5 and 6 in Step #311. Then, arcs that are respectively connected to the edges C and D smoothly are searched in Step #312. The meaning of "connect smoothly" is that the straight edge is a tangent to the arc edge. In the next Step #313, a pair of arcs is determined. In the subsequent Step #314, the closed area defined by the pair of arcs and two lines connecting between end points of the pair of arcs (the hatching area 46 plus the reverse hatching areas 47 and 48 as shown in FIG. 8) is drawn as the cross section shape (the cross section to be swept).

If the third option designating the entire area is set in Step #300, all searched edges are drawn in Step #321. Namely, the entire area of the designated surface 45 as shown in FIG. 8 is regarded as the cross section to be swept.

Thus, in the sheet-metal model as shown in FIG. 2, the model including the bottom plate 31, four side plates 32–35 generated from the four end surfaces of the bottom plate 31 and abutting portions between the neighboring side plates processed appropriately is obtained. After that, the upper surface rim portions 36–39 are produced by the bending process performed on the upper end surfaces of the four side plates 32–35 inwardly. This bending process is realized by performing the rotation feature and the sweep feature explained above on the upper end surfaces of the side plates 32–35 as the cross section to be processed.

On this occasion, since the upper surface rim portions 36–39 are on the same plane, the upper surface rim portions 36–39 become one merged plate from the viewpoint of a mechanism of the feature base. As a sheet-metal model, a sheet division process should be done for forming gaps at each boundary between neighboring upper surface rim portions among the four upper surface rim portions 36–39 as shown in FIG. 2. This sheet division will be explained as below.

Figure 10A:
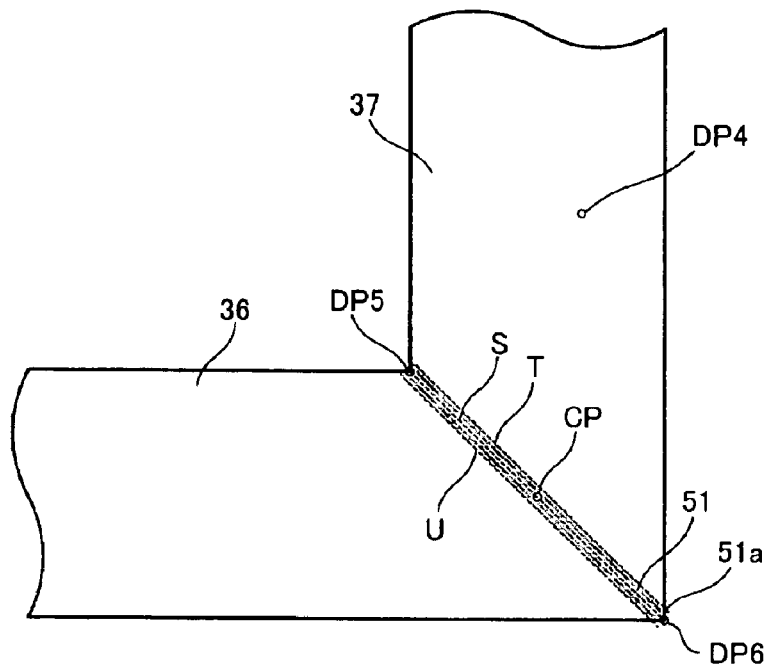
FIGS. 10A and 10B are plan views showing an example of sheet division.
Figure 10B:
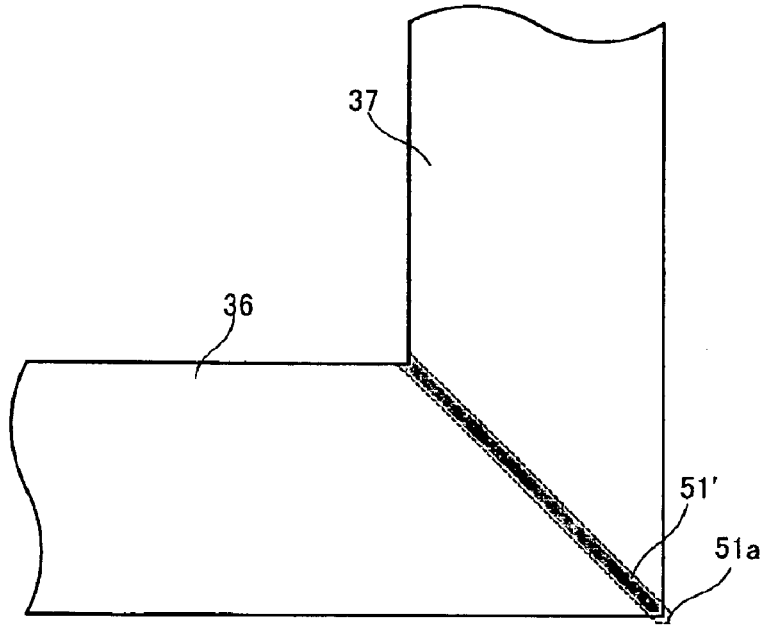

FIGS. 10A and 10B are plan views showing an example of the sheet division. It shows the case where the sheet division is performed on the surface of one plate corresponding to the upper surface rim portions 36 and 37. The user designates a point DP4 for specifying a surface (a plate) on which the sheet division is performed and two points DP5 and DP6 for specifying a division line. The sheet division portion 154 and the cross section shape processing portion 156 included in the sheet-metal model processing portion 15 as shown in FIG. 1 performs the following procedure for generating a cross section for the sheet division from the three designated points DP4, DP5 and DP6, and for sweeping this cross section by the thickness of the plate so as to generate a sweep slit, which divides the one plate into two plates (the upper surface rim portions 36 and 37).

Figure 11:
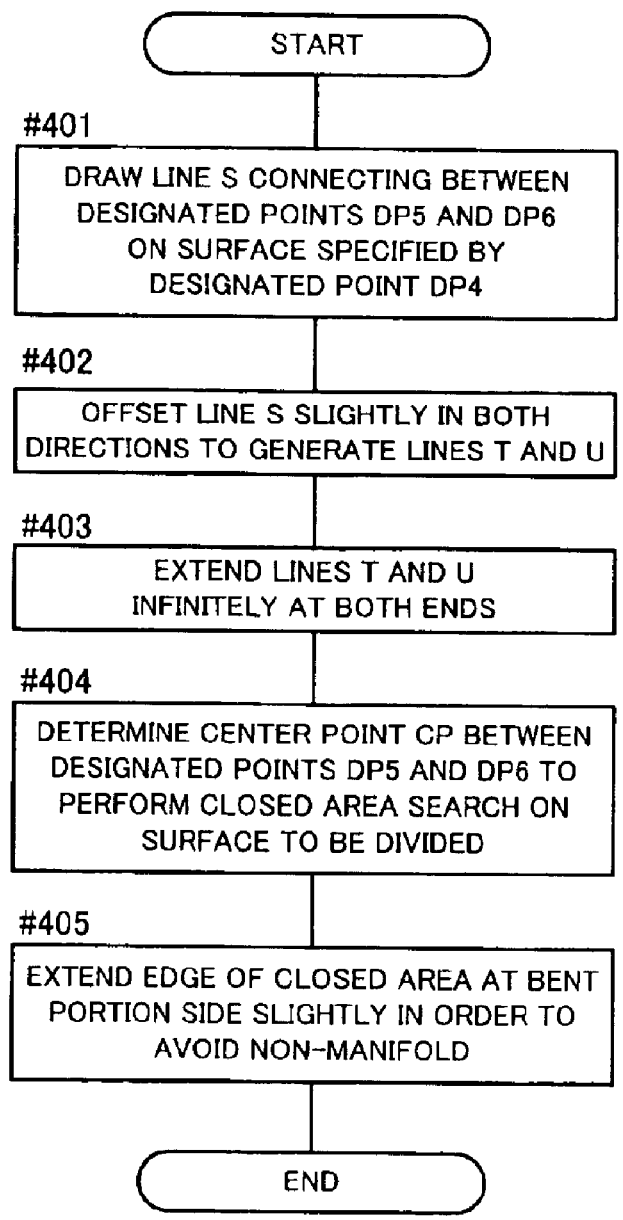
FIG. 11 is a flowchart of a process for generating a shape of a cross section for sheet division.

FIG. 11 is a flowchart of a process for generating a shape of a cross section for sheet division. In Step #401, a line S connecting between the designated points DP5 and DP6 is drawn on the surface specified by the designated point DP4, i.e., the surface to be divided (see FIG. 10A). In the next Step #402, the line S is offset slightly in both directions to generate lines T and U, which are extended infinitely at both ends in Step #403.

Figure 12:
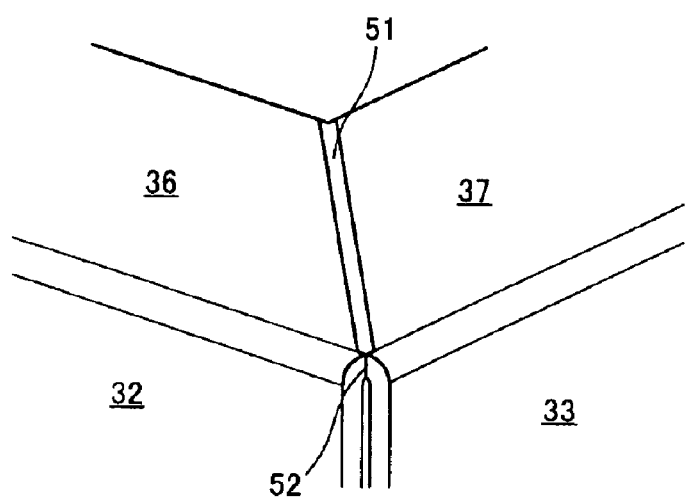
FIG. 12 shows a generation of non-manifold caused by the sheet division using the sweep slit.

In the next Step #404, a center point CP between the designated points DP5 and DP6 is determined, and the closed area search is performed on the surface to be divided. As a result, a closed area defined by the line T, the line U and contours of the surface to be divided is obtained as shown in FIG. 10A. However, as shown in FIG. 12, if this area 51 is the cross section of the sweep slit, a boundary line 52 between the side plates 32 and 33 contacting each other at the bent portion will be remained. In other words, a non-manifold will be generated.

In order to avoid this non-manifold, in Step #405, the edge 51a of the closed area 51 at the bent portion side is extended slightly as shown in FIG. 10A. As a result, an area 51' as shown in FIG. 10B is obtained. This area 51' is used for the cross section for generating the sweep slit and is swept by the thickness of the plate. Thus, the one plate is divided into two plates; one is the upper surface rim portion 36 that is bent from the side plate 32 and another is the upper surface rim portion 37 that is bent from the side plate 33 without the boundary line 52 between the side plates 32 and 33 at the bent portion (i.e., a gap is formed between them).

Concerning other three portions, sweep slits are generated in the same way so that the four upper surface rim portions 36, 37, 38 and 39, which are respectively bent from the side plates 32, 33, 34 and 35, are separated from each other appropriately.

As explained above, according to a method and a computer program of the present invention for generating a three-dimensional sheet-metal model, a shape related to a sheet-metal can be added on the basis of an existing three-dimensional model without a sheet-metal property or data indicating only a shape generated by another system without setting a sheet-metal attribution such as a material or a thickness of the sheet-metal. In addition, since a sheet-metal model can be generated utilizing a general feature without using a special feature that is unique to a sheet-metal, a user is not required to obtain knowledge about the feature that is unique to a sheet-metal model.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for generating a three-dimensional sheet-metal model on a computer screen using a CAD for generating a solid model by a general feature without a sheet-metal attribution, the method comprising the steps of:

(a) estimating a thickness of a sheet-metal from a cross section designated by a user;
    (b) representing a bent portion of the sheet-metal by rotating a cross section designated by the user around a set axis in accordance with a bending direction designated by the user and by sweeping the rotated cross section by a length designated by the user;
    (c) representing an abutting portion by sweeping a cross section designated by the user by a length designated by the user; and
    (d) realizing sheet division by a sweep slit that is formed by sweeping a tiny cross section including a division line designated by the user on a plane designated by the user.

2. A method according to claim 1, wherein the step (a) for estimating a thickness of a sheet-metal includes the substeps of searching an edge that is closest to a point designated by the user for designating the cross section, searching an edge that is opposed to the edge in parallel, and estimating a distance between the two searched edges as the thickness of the sheet-metal.

3. A method according to claim 1, wherein if the cross section designated by the user includes a curve edge in the step (b) for representing a bent portion of the sheet-metal, the step (b) includes the substep of determining a cross section for bending that is a rectangular cross section area including a point designated by the user for designating the cross section except for the curve edge area.

4. A method according to claim 1, wherein if the cross section designated by the user includes a curve edge in the step (c) for representing an abutting portion, the step (c) includes the substep of determining a cross section to be swept that is selected from a group of (i) a rectangular cross section area including a point designated by the user for designating the cross section except for the curve edge area, (ii) the rectangular cross section area plus the curve edge area and (iii) the entire area of cross section designated by the user.

5. A computer program that is installed in and executed by a computer as a CAD program for generating a three-dimensional sheet-metal model on a computer screen, the program cooperating with a CAD program for generating a solid model by a general feature without a sheet-metal attribution and making the computer execute the process including the steps of:

(a) estimating a thickness of a sheet-metal from a cross section designated by a user;
    (b) representing a bent portion of the sheet-metal by rotating a cross section designated by the user around a set axis in accordance with a bending direction designated by the user and by sweeping the rotated cross section by a length designated by the user;
    (c) representing an abutting portion by sweeping a cross section designated by the user by a length designated by the user; and
    (d) realizing sheet division by a sweep slit that is formed by sweeping a tiny cross section including a division line designated by the user on a plane designated by the user.

6. A computer program according to claim 5, wherein the step (a) for estimating a thickness of a sheet-metal includes the substeps of searching an edge that is closest to a point designated by the user for designating the cross section, searching an edge that is opposed to the edge in parallel, and estimating a distance between the two searched edges as the thickness of the sheet-metal.

7. A computer program according to claim 5, wherein if the cross section designated by the user includes a curve edge in the step (b) for representing a bent portion of the sheet-metal, the step (b) includes the substep of determining a cross section for bending that is a rectangular cross section area including a point designated by the user for designating the cross section except for the curve edge area.

8. A computer program according to claim 5, wherein if the cross section designated by the user includes a curve edge in the step (c) for representing an abutting portion, the step (c) includes the substep of determining a cross section to be swept that is selected from a group of (i) a rectangular cross section area including a point designated by the user for designating the cross section except for the curve edge area, (ii) the rectangular cross section area plus the curve edge area and (iii) the entire area of cross section designated by the user.

9. A recording medium than can be read by a computer and stores a program recited in claim 5 for generating a three-dimensional sheet-metal model on a computer screen using a CAD for generating a solid model by a general feature without a sheet-metal attribution.

* * * * *

UNITED STATES PATENT AND TRADEMARK OFFICE
CERTIFICATE OF CORRECTION

PATENT NO.    : 6,879,872 B2
DATED         : April 12, 2005
INVENTOR(S)   : Yuichiro Fukumura It is certified that error appears in the above-identified patent and that said Letters Patent is hereby corrected as shown below:

<u>Column 10,</u>
Line 46, change "than" to -- that --.

Signed and Sealed this

Twenty-seventh Day of December, 2005

JON W. DUDAS
*Director of the United States Patent and Trademark Office*